Patented July 17, 1934

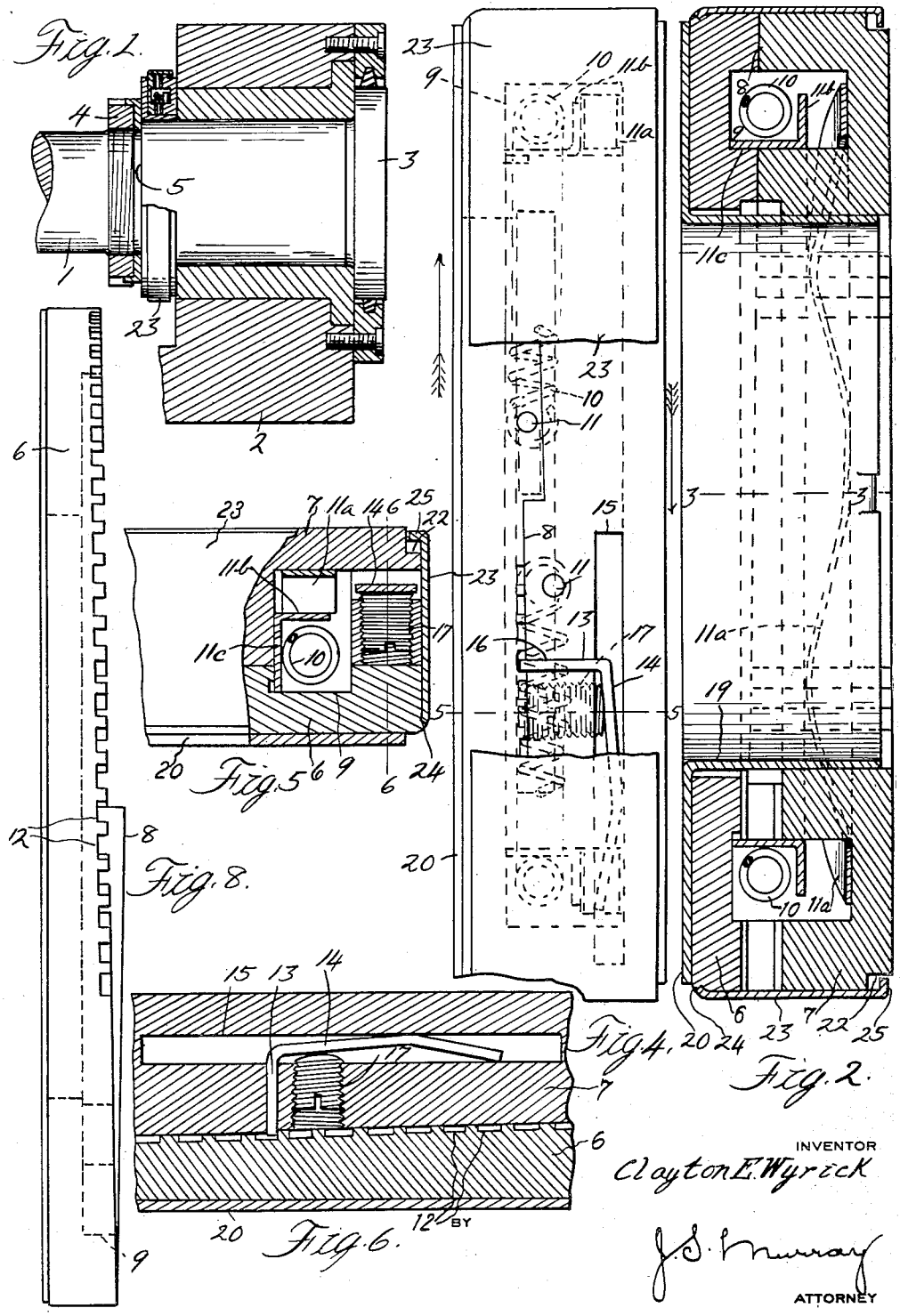

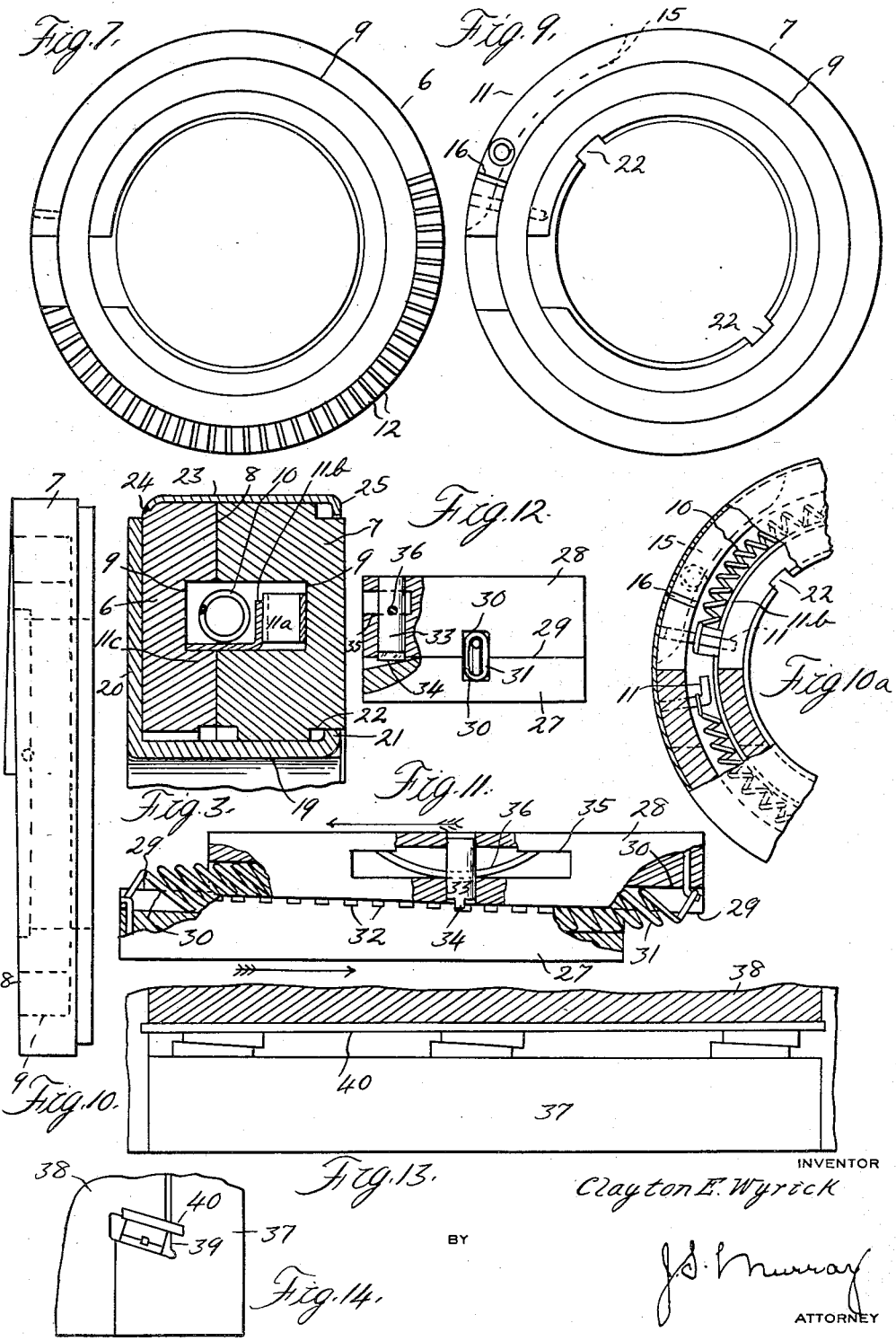

1,966,781

UNITED STATES PATENT OFFICE 1,966,781

AUTOMATIC COMPENSATOR FOR WEAR AND LOST MOTION

Clayton E. Wyrick, Wyandotte, Mich., assignor to Wyrick Engineering Company, Wyandotte, Mich., a corporation of Michigan Application October 20, 1930, Serial No. 489,930

30 Claims. (Cl. 85—50)

This invention relates to compensators for wear and lost motion, and particularly to devices for automatically regulating clearance between relatively moving parts.

As regards its more general principles of operation, the present invention somewhat resembles the disclosure of my copending application, Serial Number 408,001, filed Nov. 18, 1929, and may be considered an improvement thereon.

The above mentioned disclosure of my copending application is of a device establishing and maintaining predetermined limits of clearance of play between two relatively moving parts, and an object of the present invention is to simplify said device and reduce its cost.

In accomplishing this object, the invention provides two members of a clearance regulator or compensator with similar engaged cam faces and urges them by a spring or the like in a relative travel along said faces, such as to increase the joint thickness of said members, response of said members to said spring being regulated by a detent on one thereof so coacting with a series of stops on the other that relative travel occurs only when the regulated clearance has reached a predetermined maximum, and such travel then establishes a predetermined minimum of such clearance.

Another object is to provide the aforementioned detent with a tooth for successively engaging the stops of said series, and to adapt said detent to yield away from the stop-carrying member of the compensator in the event of a heavy force abruptly taking effect axially of the compensator during the moment of advance of said detent from one of said stops to another, whereby there is prevented possible damage to said detent or stops through concentration of such a force thereupon.

A further object is to adapt the aforementioned detent to be adjusted as to its extent of projection from its supporting member, and thus regulate the clearance required between the compensator members to disengage said detent from any of said stops.

A still further object is to provide improved means for preventing dust, dirt or liquids from entering between the coacting cam faces of the aforesaid clearance regulator.

Still another object is to definitely prevent relative rotation between two spiraly cammed, engaging members consequent to relative rotation of parts regulated as to their clearance by said cammed members.

Another object is to adapt the described clearance regulating means to be applied to relatively sliding, as well as relatively rotative parts.

An additional object is to completely enclose all elements of the described compensator within the cammed members thereof and to hold the latter in a permanent assembly that will facilitate installation of the compensator and prevent tampering with its mechanism.

These and various other objects the invention attains by the construction hereinafter described, and illustrated in the accompanying drawings, wherein:

Fig. 1 is a vertical, axial, sectional view of a bearing and shaft journaled therein, showing the herein-disclosed compensator regulating axial play of the shaft in said bearing.

Fig. 2 is a diametrical sectional view of the compensator, as it appears in Fig. 1, but drawn to a considerable larger scale.

Fig. 3 is a fragmentary radial section of the compensator, taken on the line 3—3 of Fig. 2.

Fig. 4 is an elevational view of the compensator, showing its peripheral or edge face, certain parts being broken away to clarify underlying features.

Fig. 5 is a fragmentary radial section, taken on the line 5—5 of Fig. 4, and showing a leaf spring detent mounted in one of the cammed compensator-forming rings, to engage the other.

Fig. 6 is another fragmentary section of this feature, taken on the line 6—6 of Fig. 5.

Fig. 7 is a side elevational view of one of the spirally cammed rings, showing its cammed face.

Fig. 8 is an edge view of the same.

Fig. 9 is a side elevational view of the other of said rings, showing its cammed face.

Fig. 10 is an edge view of the same.

Fig. 10a is a fragmentary side view of the compensator with portions thereof broken away to disclose means for anchoring a spring to the compensator members.

Fig. 11 is a side elevational view, partially in section, of a modified form of the invention, particularly suited to regulate sliding clearance between reciprocating parts and their guides.

Fig. 12 is an end view of the same, partly in section.

Fig. 13 is a view, in side elevation and partial section, showing several of the devices of Figs. 11 and 12, applied to a common type of slide bearing.

Fig. 14 is an end view of the same.

Referring now more in detail to the drawings, and more particularly, initially, to Fig. 1, a shaft 1 journaled in a bearing 2, carries collars 3 and 4 at opposite ends of the bearing, the collar 4 being threaded on said shaft and frictionally (or otherwise) locked against an annular shoulder 5 of the shaft.

Between the collar 4 and bearing 2 is installed a preferred form of the automatic compensator constituting the present invention, the same serving, as will presently appear, to limit relative axial or endwise play between said shaft and bearing.

Said compensator in its form shown in Figs. 1-10a comprises a pair of rings 6 and 7, encircling the shaft 1 and having closely adjacent (and at times contiguous) spiral cam faces 8, each extending continuously through an arc approximating three hundred and sixty degrees. In their cam faces, said rings are formed with opposed annular grooves 9 within which is jointly housed a tensioned spiral wire spring 10 having its ends fastened to pins 11 respectively radially carried by the rings 6 and 7. Thus said spring is adapted to urge said rings rotatively in opposite directions, tending to induce each to ascend the spiral cam surface of the other, and thereby tending to increase the joint thickness of said rings. The arrows in Fig. 4 serve to indicate the reverse rotational effort imposed by the spring 10 on the two rings.

One of the grooves 9, as that of the ring 7, additionally receives an annular sheet-metal spring 11a (preferably split) which urges the rings 6 and 7 from each other. Thus said ring is circumferentially corrugated, so as to bow it alternately to and from the cam faces of the rings and is compressed between the ring 7 and a flange 11b outturned upon a sheet metal annulus 11c which seats the spring 10 and bridges any gap which may arise between the two rings.

In the cam face 8 of one of said rings, as 6, outwardly of the groove 9 thereof is formed a series of similar radially elongated shallow notches 12 uniformly separated, said series extending preferably about half way around the ring. Selectively engageable in said notches is a tooth 13 formed by an end portion of an elongated leaf spring detent 14. The main body of said detent is set into a groove 15 circumferentially elongated in the outer peripheral face of the cam member 7, and is bent to a shallow V form so that insertion of said body in the groove 15 somewhat reduces its angularity and subjects it to a stress urging its tooth-forming end toward the cam faces of the members 6 and 7. The tooth 13 extends at approximately a right angle to the main body of the detent and is slidable in a groove 16 radially extending from the outer periphery of the member 7, transversely extending between the groove 15 and the cam face of said member.

The extent to which the tooth 13 projects from the cam face of the member 7 is regulable by a stud 17 threaded in a bore opening in the cam face of the member 7, parallel to the axis of said member and bearing on said detent, adjacent to its toothed end.

It is to be noted that the ring 6 is formed with the notches 12 only outwardly of the groove 9 of said ring, leaving the inner portion of the cam face of said ring unbroken for coaction with the cam face of the companion ring.

Where one of the parts between which the improved regulator is interposed normally rotates relative to the other, as in the installation exemplified in Fig. 1, it is preferred to avoid any resultant frictionally induced tendency toward relative rotation of the rings 6 and 7. This is accomplished by use of an angular guard ring, preferably sheet-metal, comprising a cylindrical portion 19 interposed between the shaft 1 and the rings 6 and 7, and a radial portion 20 interposed between one of said rings, as 6, and the bearing or abutment adjacent to said ring, as 4. From the part 19 of said ring, at its edge remote from the part 20, one or more tongues 21 are stuck outwardly a sufficient distance to engage in one or more shallow grooves 22 extended parallel to the axis of the ring 7 in its interior peripheral face. Thus if the friction acting between the abutment 4 and the guard 19, 20 effects rotation of the latter, both rings 6 and 7 will turn in unison with said guard, whereas if friction between the bearing 2 and ring 7 holds the latter from turning, the guard 19, 20 is also held, and consequently the ring 6.

It will be noted that the use of this guard 19, 20 does not in any way interfere with relative axial movement of the rings 6 and 7, since the tongues 21 are free to move in said groove parallel to the axis of said rings.

To hold the members 6 and 7 and parts which they enclose in assembly and to exclude dust, dirt, or other foreign matter from between said members a sheet metal cover ring 23 peripherally encloses both of said members bridging the gap between them, and being preferably secured to one of said members and free relative to the other. Thus one edge portion of said cover ring is spun into a shallow peripheral groove 24 in the member 6, securing said ring to said member and the other edge portion of said ring is flanged inwardly as indicated at 25 in such spaced relation to an annular shoulder 26 of the member 7 as to afford the two cam members a definite maximum separative travel, while preventing their complete disassembly. This permits a complete and final assembly of the compensator at the factory and assures that it will reach the user in proper condition for unitary installation, and also prevents tampering with the device or unauthorized adjustment of the stud 17.

In use of the described form of the improved compensator, the spring 10 urges the rings 6 and 7 in a relatively reverse rotation while the spring 11a tends to separate them axially, and response of said rings to such rotational effort is resisted by reception of the detent tooth 13 in one of the notches 12. The axial effort of the spring 11a, separatively acting on the two rings, tends to withdraw the tooth 13 from the notch 12 receiving it, and the rings 6 and 7 will yield to said effort only to the extent that wear or other action permits separation of the parts between which the compensator is interposed. These parts in Fig. 1 are the bearing 2 and collar 4. Assume that initially there is established between the cam faces 8 a predetermined minimum of clearance, as for example, .002 of an inch. This clearance will gradually increase as wear (or other factors) take effect. When the amount of separation—or clearance—between the cam faces 8 reaches a predetermined maximum, as for example .005 of an inch, the tooth 13 will be entirely withdrawn from the notch 12 receiving it, provided of course, that said tooth initially projects .003 of an inch into said notch. Immediately upon such withdrawal, the spring 10 effects a limited relative rotation of the rings 6 and 7, whereby said tooth slips across the rib against which it has been stopped and enters the next higher notch, a radial wall of the latter again stopping said detent. This limited relative travel of the two rings, in advancing one thereof a definite distance up the incline of the other, effects an increase in the joint thickness of the rings, predeterminedly equal to initial projection of the tooth 13 into said notch, this having been assumed as .003 of an inch. There is thus reduced to this extent the initially existing clearance of .005 of an inch, so that the clearance following the described automatic adjustment is again .002 of an inch, the minimum clearance permitted by the compensator. This regulation is automatically repeated as each increment of wear establishes the predetermined maximum of clearance between the cam faces.

The minimum permissible clearance established between the members 6 and 7 following each automatic compensation for wear is determined by the pitch of the spiral cam faces of said members and by the distance between the notches 12. The maximum permissible clearance is determined by adjustment of the stud 17, according as the latter is shifted inwardly or outwardly the extent to which the tooth 13 initially enters one of the notches 12 is decreased or increased with a corresponding effect upon said maximum clearance.

In advancing intermittently from notch to notch, the detent 14 is required by the cam inclination of each rib surface over which it rides to undergo a slight retraction. The spring nature of the described detent 14 yieldingly permit such retraction, and further allows the detent to yield in the event a heavy axially acting force takes sudden effect during a relative rotary advance of the members 6 and 7. Were it not for the described mounting of the detent, the stress imposed by such force would be concentrated on the tooth 13 and the rib over which said tooth is advancing, and would possibly damage said tooth or rib. Yielding of the detent under such a condition allows the cam faces of the two rings to fully engage and thus safely transmit the abnormal force.

The described compensator is completely automatic in action, and does not appreciably increase the load on a bearing or other part to which it is applied. The direction of rotation of any shaft with which said compensator may be associated has no effect on the compensating action, since the guard 19, 20 assures that any frictionally induced rotation of either compensator ring will be communicated to the companion ring.

It is important to note that any take up beyond the desired minimum is positively avoided, and that the coacting cam surfaces of the paired rings are amply extensive to safely transmit such axial thrusts as may arise in use.

Referring now to that form of the invention illustrated in Figs. 11, 12, 13 and 14, the reference characters 27 and 28 designate a pair of blocks, preferably metallic, having relatively remote parallel faces and having adjacent plane faces 29 similarly inclined at a very acute angle to said parallel faces. Said faces 29 are grooved from end to end thereof in the direction of their incline as indicated at 30, the grooves 30 opening one into the other, and jointly receiving a coiled spring 31, the ends of which are anchored in any suitable manner to the remote ends of said blocks. Said spring is under a tension urging each block up the inclined face 29 of the other and thus tending to increase the joint thickness of the two blocks, as measured between their remote parallel faces. The convolutions of said spring are furthermore compressively distorted within the grooves 30 at a more acute inclination to the faces 29 of the blocks than is established by their "set", so that they tend to expand transversely to the spring axis and to thereby force the two blocks apart.

Extended longitudinally of the block 27 in its face 29 is a series of shallow notches 32, each transverse to said face, and slidable in the block 28 is a plunger detent 33 diametrically formed upon one of its end faces with a tooth 34 for successive engagement in said notches. A recess 35 opens in a side face of the block 28 and is traversed by the mid portion of said detent, and within said recess, a wire spring 36 is carried by said detent, passing diametrically through the latter and having bowed end portions projecting oppositely from said detent. The central portion of said spring engages that wall of the recess which is nearest adjacent to the toothed end of the detent, the opposite wall of said recess being engaged by the ends of said spring and being slightly divergent from a transverse relation to the detent to oppose accidental turning of the detent about its axis.

Figs. 13 and 14 illustrate an application of the invention in its form just described to relatively reciprocatory parts 37 and 38. In an elongated opening 39 formed between overlapped portions of said parts is installed a plurality of the compensators illustrated in Figs. 11 and 12 a wear plate 40 being extended above said compensators.

Assuming a minimum clearance to initially exist between the faces 29, this clearance will gradually increase due to wear or other reaction between the parts 37 and 38 and when a predetermined resulting maximum of such clearance has been established the tooth 34 will have been fully withdrawn from the notch 32 which it occupied during such wear. This will permit the spring 36 to take effect to shift the blocks 27 and 28 each sufficiently up the incline of the other to advance the tooth 34 into the next higher notch. There results a definite increase in the joint thickness of the two blocks, due to separative action of the spring 31, and a resultant equal decrease in the clearance between the faces 29. This increase of clearance is predeterminedly equal to the distance which the tooth 34 initially projected into the first-engaged notch, so that the minimum clearance which initially prevailed is again established. This automatic adjustment is repeated as each successive increment of wear occurs, as in the first-described construction.

It will be noted that the spring 31 in addition to urging the blocks 27 and 28 both separatively and relatively lengthwise, also acts to guide said blocks and maintain their constant proper opposed relation.

In either described form, the compensator has the nature of a self-contained unit, capable of being fully assembled and of maintaining its unitary assembly independently of the parts which it is adapted to control. This facilitates manufacture and distribution, and simplifies installation of the device.

The field of use of the described compensator is very broad, it being particularly desirable to regulate clearance between working parts of machine tools, such as drills, lathes, planers, etc. It also finds extensive use on motor vehicles, and in fact as an application to practically all machinery in which maintenance of accurate clearance is a consideration.

The extent to which the series of notches is extended upon the adjacent faces of the paired members of the compensator in either of its described forms depends, of course, on the desired maximum distance of relative parallel travel required of said members. The magnitude of this relative travel is dependent primarily on the magnitude of the maximum clearance it is desired to establish. In most installations of the compensator, in its first described form the maximum relative rotation of the two cam rings may be measured by an angle of one hundred twenty degrees, but to take care of special cases, it is preferred to extend the notches as has been described, through substantially one hundred eighty degrees.

While it is apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. A clearance regulator comprising parts relatively movable to take up undue clearance, means urging said parts in a clearance take-up movement, and means for automatically maintaining maximum and minimum limits of the clearance established by said regulator, including an element adjustable to regulate the maximum clearance.

2. In a device of the character described, the combination with two members having opposed faces, of means urging said members in a relative movement along said faces, said faces being cammed to effect an increase in the joint thickness of said members responsive to such a movement, means urging said members separatively, and means employing the separative travel of said members to regulate their thickness-increasing travel, including a provision for selectively regulating the amount of separative travel prerequisite to their thickness-increasing travel.

3. A clearance regulator comprising two members having opposed cam faces and relatively movable along said faces to increase the joint thickness of said members, and means so regulating the thickness-increasing travel of said members as to maintain maximum and minimum limits of play between said members, including a provision for selectively regulating said maximum limit.

4. A compensator for wear and lost motion comprising two adjacent members, having opposed cam faces and relatively movable along said faces to increase their joint thickness, a series of stops upon one of said members, said series being coextensive with a portion of its cam face, a detent upon the other member projecting toward said stops and yieldable therefrom under abnormal stress, means urging said members separatively, and means urging said members relatively along said cam faces in a direction to increase their joint thickness, said detent being successively engageable with said stops through thickness-increasing travel of said members, and being successively releasable from said stops through separative travel of the said members.

5. A compensator as set forth in claim 4, said cam faces being coaxially spiral.

6. A compensator as set forth in claim 4, said cam faces being coaxially spiral and said stops being shoulders radial to the axis of said spiral faces.

7. In a compensator as set forth in claim 4, a spring carried by the detent-supporting member, maintaining a normal stop-engaging position of the detent and yieldable responsive to an obnormal stress exerted on the detent to permit retraction of the latter.

8. In a compensator as set forth in claim 4, a spring carried by the detent-supporting member, formed by a portion of the detent and yieldable under an abnormal stress exerted on the detent to permit retraction of the latter.

9. In a compensator as set forth in claim 4, one of said adjacent members having a recess laterally opening therein, and said detent having a portion in said recess, a spring within said recess maintaining a normal stop-engaging position of the detent and yieldable to an abnormal stress exerted on the detent.

10. A compensator for wear and lost motion comprising two adjacent members, having opposed cam faces, and relatively movable along said faces to increase their joint thickness, a series of stops upon one of said members, said series being coextensive with a portion of the cam face of said member, a detent upon the other member projecting toward said stops and adjustable on said other member to vary its extent of such projection, means urging said members separatively and means urging said members relatively along said cam faces in a direction to increase their joint thickness, said detent being successively engageable with said stops through thickness-increasing travel of said members, and being successively releasable from said stops through separative travel of said members.

11. A compensator for wear and lost motion comprising two adjacent members, having opposed cam faces, and relatively movable along said faces to increase their joint thickness, a series of stops upon one of said members, said series being coextensive with a portion of the cam face of said member, a detent upon the other member projecting toward said stops and having a spring portion urging it toward said stops, means engaging said spring portion for adjusting said portion to regulate the extent of projection of the detent toward said stops, means urging said members separatively, and means urging said members relatively along said cam faces in a direction to increase their joint thickness, said detent being successively engageable with said stops through thickness-increasing travel of said members, and being successively releasable from said stops through separative travel of said members.

12. A compensator as set forth in claim 11, said detent-adjusting means being a screw, threaded into the detent-carrying member and accessible through the cam face of said member.

13. In a device of the character described, a pair of adjacent members having opposed cam faces and relatively movable along said faces to increase their joint thickness, means urging said members separatively and means urging them in a relative travel along said cam faces tending to increase their thickness, the two members jointly forming an annular chamber receiving both of said means, and means employing the separative travel of said members to regulate their thickness-increasing travel, including a provision for regulating the amount of separative travel prerequisite to their thickness-increasing travel.

14. In a device of the character described, a pair of adjacent circular members having opposed spiral cam faces and relatively movable along said faces to increase their joint thickness, a coiled spring encircling portions of said members and urging them relatively rotatively in a direction to increase the joint thickness of said members, and a corrugated circular sheet metal spring, urging said members separatively, and means employing the separative travel of said members to regulate their thickness-increasing travel, including a provision for regulating the amount of separative travel prerequisite to their thickness-increasing travel.

15. In the device set forth in claim 14, a ring seating said coiled spring jointly on the portions surrounded by said spring, said ring having a portion forming an abutment for said corrugated spring.

16. A compensator for wear and lost motion, comprising two coaxial members having opposed spiral cam faces and relatively rotative to increase their joint thickness by coaction of said faces, means urging said members in a relative rotation along said faces such as to increase their joint thickness, and means resisting relative rotation of said cammed members responsive to any frictional torque laterally applied to either thereof.

17. A compensator for wear and lost motion, comprising two coaxial members having opposed spiral cam faces and relatively rotative to increase their joint thickness by coaction of said faces, means urging said members in a relative rotation along said faces such as to increase their joint thickness, a rotational guard applied to an end face of the compensator freely engaging one of said cammed members, and means carried by said guard, and establishing unison of rotation between it and the other of said cammed members, while affording said other cammed member axial travel relative to said guard.

18. A compensator for wear and lost motion comprising two members relatively rotative to increase their joint thickness, means associated with said members urging their relative rotation in a direction to increase their joint thickness, and a member connecting said members resisting their relative rotation responsive to torque endwise acting on the compensator.

19. A compensator for wear and lost motion comprising two coaxial, relatively rotative annular members having spirally cammed adjacent faces, means rotatively reacting between said members, urging each thereof up the incline of the other, and a rotational guard freely engaging one of the relatively remote faces of said members and having an interior peripheral engagement with the other of said members compelling its rotation in unison with said guard, the last named member being movable axially of the compensator relative to said guard.

20. A compensator for wear and lost motion comprising two annular, coaxial, relatively rotative members, having adjacent spiral cam faces, means reacting between said members, urging each thereof rotatively up the cam incline of the other, and a rotational guard comprising a cylindrical portion interiorly coaxial with said members and connected to one thereof to rotate in unison therewith and axially slidable relative thereto, said guard further comprising a radial member engaging the outer face of the other of said members.

21. A compensator for wear and lost motion comprising two adjacent members having opposed faces correspondingly formed with coaxial spiral cams, for riding one on the other to increase the joint thickness of said members, means urging said members rotatively about their cam axis in a direction tending to increase their joint thickness, a series of stops carried upon the cam face of one of said members, and conforming in their succession to the spiral form of said face, a detent projecting from the cam face of the other of said members for successive engagement with said stops, to limit the thickness-increasing rotation of said members, and means for adjusting said detent on the member carrying said detent to provide for regulation of the clearance between said members prerequisite to release said detent from any of said stops.

22. A compensator for wear and lost motion, comprising two adjacent members having opposed, substantially spiral coaxial cam faces, and relatively rotatable about the axis of said faces to increase their joint thickness through coaction of said faces, said members jointly forming an arcuate chamber, substantially coaxial with said faces, and means within said chamber urging said members relatively rotatively in a direction to increase their joint thickness.

23. A compensator for wear and lost motion, comprising two adjacent members having opposed, substantially spiral and substantially coaxial cam faces, and relatively rotatable about the axis of said faces to increase their joint thickness through coaction of said faces, said members having opposed grooves in their opposed faces jointly forming an arcuate chamber substantially coaxial with said faces, and means within said chamber urging said members in a relative travel along said faces, tending to increase their joint thickness.

24. A compensator for wear and lost motion comprising two adjacent members having opposed substantially spiral cam faces, said members, being relatively rotatable to increase their joint thickness by coaction of said faces, a coiled spring urging said members in a relative rotation such as to increase their joint thickness, and an arcuate member seating said spring and bridged between said cam-forming members.

25. A compensator for wear and lost motion comprising two adjacent members having substantially spiral and substantially coaxial opposed cam faces and relatively rotative about the axis of said faces to increase the joint thickness of said members, through coaction of said faces, means resiliently urging said members separatively, and means independently urging said members in a relative rotation tending to increase their joint thickness.

26. A compensator for wear and lost motion comprising two adjacent members having substantially spiral and substantially coaxial opposed cam faces and relatively rotative about the axis of said faces to increase the joint thickness of said members through coaction of said faces, means urging said members in a relative rotation such as to increase their joint thickness, a guard member engaging the outer end face of one of said cammed members, and rotative relative to the cammed member, so engaged, and a connection establishing unison of rotation between the other cammed member and said guard member.

27. A compensator for wear and lost motion comprising two adjacent members having opposed cam faces and relatively movable along said faces to increase their joint thickness, means urging said members relatively along said cam faces in a direction to increase their joint thickness, a series of stops movable as a unit with one of said cammed members in its thickness-increasing travel and movable as a unit to and from the other of said cammed members, a detent carried by the last-mentioned cammed member and coacting with said stops, means urging said stops, as a unit away from the detent-carrying member, said detent being successively engageable with said stops through thickness-increasing relative travel of the cammed members and being successively releasable from the stops through movement of the stops away from the detent.

28. A compensator for wear and lost motion comprising two adjacent members having substantially spiral and substantially coaxial opposed cam faces, and relatively rotative about the axis of said faces to increase the joint thickness of said members, through coaction of said faces, means urging said members in a relative rotation such as to increase their joint thickness, a succession of stops extending in a series curved about the axis of said cam faces, and rotative as a unit with one of said cammed members, and movable as a unit to and from the other of said cammed members, in the direction of said axis, means urging said stops as a unit away from the detent-carrying member, said detent being successively engageable with said stops through thickness-increasing relative travel of the cammed said stops through movement of the stops away from the detent.

29. A compensator for wear and lost motion comprising three substantially coaxial adjacent annular members, one intermediate the other two and rotative relative to the other two about the common axis of said members, means connecting the two outer members for rotation in unison about the common axis of said members, said means affording said outer members a relative axial movement, the intermediate member and one of the outer members being formed on their opposed faces with complementary spiral cams, a detent laterally projecting from one of said members toward the adjacent member, an arcuate series of stops upon said adjacent member, successively engageable by said detent through a progressive rotative advance of the intermediate member relative to the two outer members, means rotatively reacting between the two cammed members, urging each thereof up the cam incline of the other, and means urging the stop-carrying member and detent member separatively, tending to release the detent from any engaged stop.

30. In a compensator for wear and lost motion as set fort in claim 29, means upon the detent-carrying member for regulating the extent of lateral projection of the detent.

CLAYTON E. WYRICK.